United States Patent [19]

Christner et al.

[11] 4,242,223
[45] Dec. 30, 1980

[54] PROCESS FOR RECEIVING, STORING AND HANDLING ALUMINUM HYDROXIDE WET HYDRATE

[75] Inventors: Hans Christner, Frankfurt; Wolfgang Roebke, Bruhl; Hermann Ramelow, Kelkheim; Ewald Dittrich, Grossekrotzenburg, all of Fed. Rep. of Germany

[73] Assignee: Deutsche Gold- und Silber-Scheideanstalt vormals Roessler, Frankfurt, Fed. Rep. of Germany

[21] Appl. No.: 56,692

[22] Filed: Jul. 11, 1979

[51] Int. Cl.³ .................. C09D 1/00; B01J 13/00
[52] U.S. Cl. .................. 252/313 R; 106/286.5; 252/182; 252/455 Z; 252/314; 423/329; 423/265; 423/629
[58] Field of Search .................. 423/265–267, 423/600, 625; 252/313 R, 317, 182, 314; 106/286.5

[56] References Cited

U.S. PATENT DOCUMENTS

| | | | |
|---|---|---|---|
| 2,734,796 | 2/1956 | Ashley | 423/265 |
| 3,860,070 | 1/1975 | Herce | 252/317 |
| 3,954,659 | 5/1976 | O'Brien | 252/317 |
| 4,052,538 | 10/1977 | Eddy | 423/600 |
| 4,073,867 | 2/1978 | Roebke | 423/329 |

FOREIGN PATENT DOCUMENTS 2447021  5/1976  Fed. Rep. of Germany.

OTHER PUBLICATIONS

*Chemical Abstracts*, vol. 81, 1974, Nos. 54,135p, q.

*Primary Examiner*—Brian E. Hearn
*Attorney, Agent, or Firm*—Cushman, Darby & Cushman

[57] ABSTRACT

There is disclosed a process for receiving, storing and handling aluminum hydroxide wet hydrate, wherein the aluminum hydroxide wet hydrate is unloaded, optionally in batches, by means of a dumping means, e.g., a dump truck into a hopper which is equipped with a conveying means, e.g., a plate conveyor, the aluminum hydroxide wet hydrate supplied by means of a transporting apparatus, e.g., a double belt vertical conveyor, to a weighing means, e.g., a conveyor-type weigher and weighed, subsequently supplied to an aluminum hydroxide wet hydrate suspension tank, mixing the aluminum hydroxide wet hydrate in the tank with the amount of aqueous sodium hydroxide needed to produce a suspension of the aluminum hydroxide wet hydrate and producing a pumpable and meterable suspension of the aluminum hydroxide wet hydrate by heating to a temperature between 20° and 100° C. with the aid of a heating element and a stirrer.

14 Claims, 1 Drawing Figure

PROCESS FOR RECEIVING, STORING AND HANDLING ALUMINUM HYDROXIDE WET HYDRATE

BACKGROUND OF THE INVENTION

Aluminum hydroxide wet hydrate is a white, crystalline material having a specific gravity of 2000 kg/m$^3$ and a bulk density (apparent density) of 1200 kg/m$^3$. It can obtain 55 to 65 weight % Al$_2$O$_3$ and 45 to 35 weight % water, preferably 58 weight % Al$_2$O$_3$ and 42 weight % H$_2$O.

Aluminum hydroxide wet hydrate can be reacted to form sodium aluminate and in that way be employed as starting material for the production of aluminum silicates, as, e.g., synthetic zeolites (see, e.g., German AS No. 24 47 021 and related Roebke U.S. application Ser. No. 617,394, filed Sept. 29, 1975 and German AS No. 25 17 218 and related Roebke U.S. Pat. No. 4,073,867).

However, there appear problems for an industrial use of aluminum hydroxide wet hydrate, which problems are based on the properties of the aluminum hydroxide wet hydrate. Thus, for example, a siloing of aluminum hydroxide wet hydrate is not possible because bridges form in the silo which solidify in cement-like condition and close the entire outlet cross-section of the silo. This bridge formation cannot be prevented even by known discharge aids.

It is known to store aluminum hydroxide wet hydrate in pits from which it can be lifted out with claws via cranes under considerable industrial expense and then supplied to the further working up process.

A considerable disadvantage of this method of storage in the non-uniform metering of the aluminum hydroxide wet hydrate for the further working up during which as a rule variations of up to 20 kg per batch of aluminum hydroxide wet hydrate taken from the storage pit can occur.

Furthermore, the storage of large amounts of aluminum hydroxide wet hydrate in pits requires in regard to surface area a large expenditure of space.

There is the necessity of finding a form for handling and storing aluminum hydroxide wet hydrate which permits an exact metering and slight expenditure of space.

Besides the storing and handling in known form is very time consuming, requires much personnel and accident prone. Furthermore, the aluminum hydroxide wet hydrate in uncovered storage is additionally exposed to the influence of weather through which there can occur an undesirable deterioration of the quality of the pulverulent aluminum hydroxide wet hydrate.

SUMMARY OF THE INVENTION

The purpose of the present invention is the development of a process for receiving, storing and handling aluminum hydroxide wet hydrate, comprising unloading the aluminum hydroxide wet hydrate, optionally in batches, by means of a dumping means, e.g., a dump truck 1 into a hopper (box loader) 2 which is equipped with a conveying means 3, e.g., a plate conveyor, supplying the aluminum hydroxide wet hydrate by means of a transporting apparatus, e.g., a double belt vertical conveyor 4, to a weighing means, e.g., a conveyor-type weigher 5 weighing the wet hydrate, subsequently supplying the wet hydrate to an aluminum hydroxide wet hydrate suspension tank 6, mixing the aluminum hydroxide wet hydrate in the tank with the amount of aqueous sodium hydroxide needed to produce a suspension of the aluminum hydroxide wet hydrate and producing a pumpable and meterable suspension of the aluminum hydroxide wet hydrate by heating to a temperature between 20° and 100° C. with the aid of a heating element 9 and a stirrer 8.

In a preferred form of the invention, the suspension of the aluminum hydroxide wet hydrate can be produced in aqueous sodium hydroxide containing 29 to 49 weight % Al$_2$O$_3$, 6 to 19 weight % Na$_2$O and 41 to 56 weight % water at a temperature of 20° to 100° C., preferably between 70° and 95° C. In a preferred means in the suspension of the aluminum hydroxide wet hydrate, there can be present a concentration of Al$_2$O$_3$ of 41 to 47 weight %, whereby there is used as sodium hydroxide liquor a 50 weight % aqueous sodium hydroxide.

In a further embodiment, the aqueous sodium hydroxide liquor can contain 39 weight % Na$_2$O and 61 weight % water (50 weight % NaOH).

In a preferred form of the process of the invention, there is stored an aluminum hydroxide wet hydrate which has an Al$_2$O$_3$ content of 57 to 60 weight % and a water content of 40 to 43 weight %.

Through the process of the invention, it is possible to produce with the simplest, automatic handling a supply of partially dissolved, storage stable aluminum hydroxide wet hydrate in the form of a suspension.

A great and unexpected advantage is the possibility given by the process of the invention of exactly regulating the Al$_2$O$_3$-Na$_2$O ratio, which is an important provision, e.g., for the production of aluminum silicates.

A further advantage is that the aqueous suspension of the aluminum hydroxide wet hydrate is stable against sedimentation for a time period of at least 48 hours so that the stirrer equipment in a storage tank can be kept still for a corresponding time, as can be necessary, e.g., with power failure or damage to the driving mechanism, without forming a solid phase. It is still capabling of flowing and pumping well even at room temperature up to 41 weight % water. At this high solids content it exhibits a non-Newton flow behavior, i.e., its viscosity is dependent on the rate of shear.

The process of the invention for storage of aluminum hydroxide wet hydrate furthermore has the great and unexpected advantage that with the aid of the process large amounts of aluminum hydroxide wet hydrate can be stored in a relatively small space. In this connection, it should be borne in mind that the aqueous suspension of the aluminum hydroxide wet hydrate can be stored in tanks of customary industrial size, preferably up to 250 m$^3$.

Then the suspension, whose concentration can be exactly determined can be withdrawn from this tank uniformly in controlled amounts by means of a metering pump.

BRIEF DESCRIPTION OF THE DRAWING

The invention will be further explained in connection with the drawings wherein.

Figure 1:
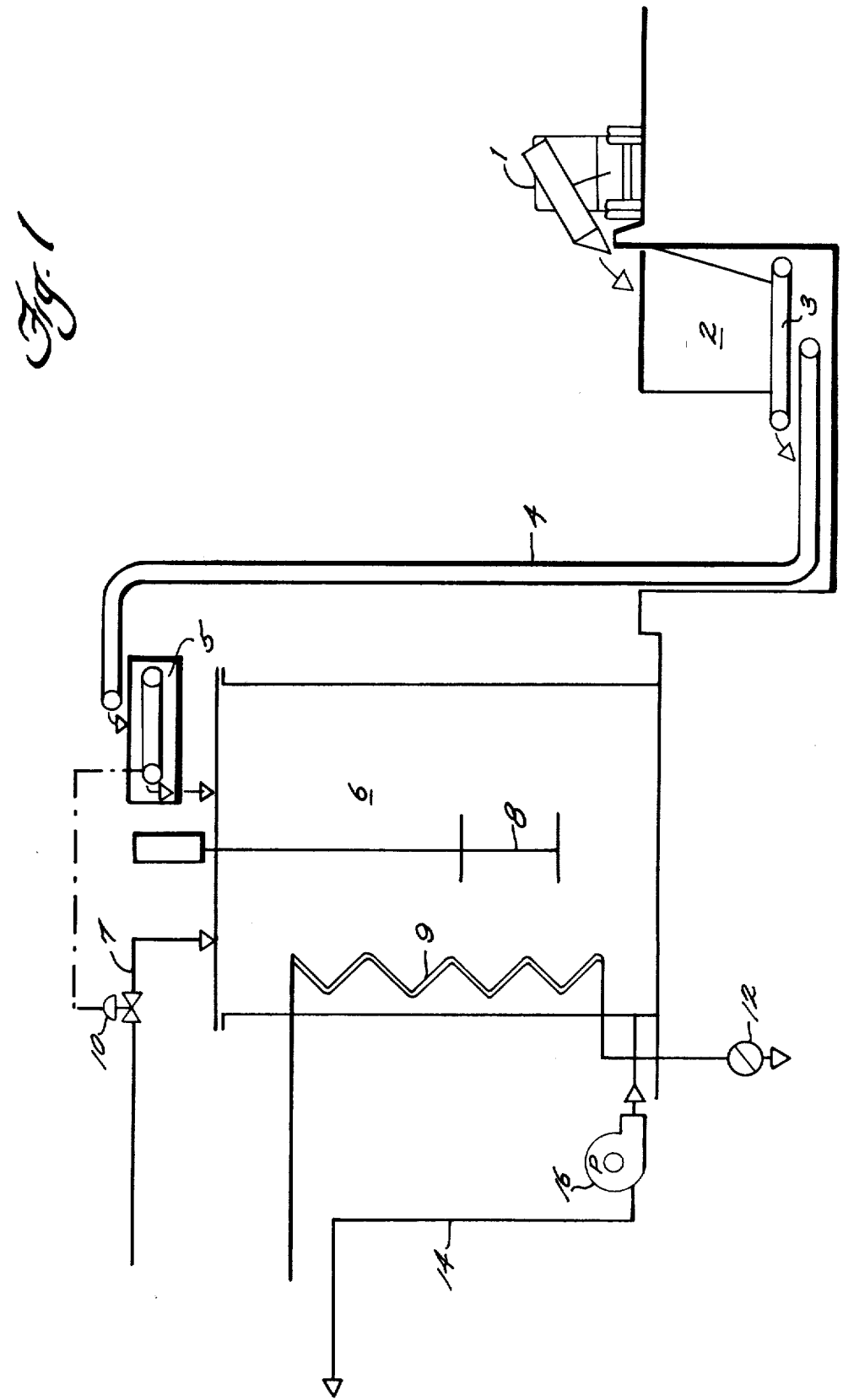
FIGURE 1 is a schematic illustration of the course of the process of the invention.

Referring more specifically to the drawing by means of the road dump truck 1, the aluminum hydroxide wet hydrate is unloaded into the hopper 2 arranged below ground level. The hopper 2 equipped with the plate conveyor 3 as transporting means continuously supplies the aluminum hydroxide wet hydrate to the double belt upright conveyor 4. The double belt upright conveyor 4 passes the aluminum hydroxide wet hydrate to the conveyor-type weigher 5 where it is weighed. The weighed aluminum hydroxide wet hydrate is supplied to the suspension storage tank 6 and an amount of aqueous sodium hydroxide liquor corresponding to the weighed amount of aluminum hydroxide wet hydrate is added via line 7 through control valve 10. The slurry obtained is heated via steam in supply pipe 9. The supply of steam is controlled by valve 12. By means of stirring with stirrer 8, there is produced a pumpable and meterable suspension of the aluminum hydroxide wet hydrate which can be removed from tank 6 via line 14 with the aid of pump 16.

Unless otherwise indicated, all parts and percentages are by weight.

The process can comprise, consist essentially of or consist of the steps set forth with the described compositions.

The process of the invention for storage of the aluminum hydroxide wet hydrate is further explained and described in connection with the following example.

DESCRIPTION OF THE PREFERRED EMBODIMENT

Example

The suspension was produced in a large scale stirred container having a volume of 255 m$^3$, ratio of slenderness H/D = 1.2. To homogenize the material there was located in the container stirring equipment, running slowly at 16.5 rpm equipped with a 3-stepped crossbeam stirrer. Furthermore, there were built in 2 flow disturbers to improve the homogenization. The container contents were heated with hot steam of 7 bar, the temperature was controlled at 85° C.

The wet hydrate loading arriving with a weight of about 30 metric tons was weighed and dumped into the hopper. The aluminum hydroxide wet hydrate had a content of Al$_2$O$_3$ of 58 weight % and a water content of 42 weight %. The corresponding amount of soda lye containing 39 weight % of Na$_2$O was preselected in the control room. For a desired suspension with 43 weight % of Al$_2$O$_3$ based on the entire amount of suspension, it amounted to 10,600 kg, i.e., there were correspondingly added 7.1 m$^3$ of soda lye.

In continuous stirred containers the loading is started, in connection therewith, the aluminum hydroxide wet hydrate is conveyed from the hopper over a plate conveyor, an upright material conveyor and, if necessary, a weighing conveyor with a load capacity of 30 metric tons/hour and the preselected amount of soda lye conveyed from a supply tank via a circulatory pump and an amount metered into the storage tank. The aluminum hydroxide wet hydrate is suspended in the soda lye in the storage tank, as a result of which the aluminum oxide obtained is readily partially dissolved. The temperature of the suspension obtained is heated to 80° C. with steam.

The thus obtained suspension is stored in the container equipped with unchanged stirrer equipment (multi-stepped cross-beam stirrer) running continuously at 16.5 rpm. When the suspension is needed for the production process the suspension is drawn off via metering pumps.

What is claimed is:

1. A process of forming a suspension of aluminum hydroxide wet hydrate stable for a period of at least 48 hours consisting essentially of adding a measured amount of aluminum hydroxide wet hydrate to a container and adding to the aluminum hydroxide wet hydrate an amount of aqueous sodium hydroxide sufficient to form a suspension stable against sedimentation with said measured amount of aluminum hydroxide wet hydrate.

2. A process according to claim 1 wherein the aqueous sodium hydroxide is added in such an amount that the suspension of aluminum hydroxide wet hydrate contains 29 to 49 weight % Al$_2$O$_3$, 6 to 19 weight % Na$_2$O and 41 to 56 weight % water.

3. A process according to claim 2 wherein the process is carried out at 70° to 95° C.

4. A process according to claim 3 wherein the aqueous sodium hydroxide employed has 50 weight % sodium hydroxide.

5. A suspension made by the process of claim 2 which suspension has been stable for at least 48 hours and still has good meterability.

6. A process for receiving, storing and handling aluminum hydroxide wet hydrate consisting essentially of dumping the aluminum hydroxide wet hydrate into a container, passing the aluminum hydroxide wet hydrate from the container to a conveyor, conveying the aluminum hydroxide wet hydrate to means for measuring the amount of aluminum hydroxide wet hydrate, adding the measured amount of aluminum hydroxide wet hydrate to a container, mixing the aluminum hydroxide wet hydrate in the container with the amount of aqueous sodium hydroxide needed to produce a stable suspension of the aluminum hydroxide wet hydrate and producing a pumpable and meterable suspension of the aluminum hyroxide wet hydrate in said container by heating the aluminum hydroxide wet hydrate-aqueous sodium hyroxide mixture in the container to a temperature between 20° and 100° C. and stirring said mixture.

7. A process according to claim 6 wherein the heating is to a temperature of 70° to 100° C.

8. A process according to claim 6 wherein the measuring is done by weighing.

9. A process according to claim 6 wherein the aqueous sodium hydroxide is added in such an amount that the suspension of aluminum hydroxide wet hydrate contains 29 to 49 weight % Al$_2$O$_3$, 6 to 19 weight % Na$_2$O and 41 to 56 weight % water.

10. A process according to claim 9 wherein the temperature is 70° to 95° C.

11. A process according to claim 6 wherein the aluminum hydroxide wet hydrate employed has an Al$_2$O$_3$ content of 57 to 60 weight % and a water content of 40 to 43 weight %.

12. A process according to claim 9 wherein the aqueous sodium hydroxide employed has 50 weight % sodium hydroxide.

13. A process according to claim 9 wherein there is included the step of pumping the suspension out of said container.

14. A process according to claim 13 wherein there is pumped suspension which has been stable against sedimentation for at least 48 hours.

* * * * *